United States Patent
Tuennermann et al.

(10) Patent No.: US 6,697,394 B2
(45) Date of Patent: Feb. 24, 2004

(54) DIRECTLY MODULATABLE LASER

(75) Inventors: Andreas Tuennermann, Jena (DE); Holger Zellmer, Magdala (DE); Jens-Peter Ruske, Jena (DE)

(73) Assignee: Jenoptik LDT GmbH, Gera (DE)

( * ) Notice: Subject to any disclaimer, the term of this patent is extended or adjusted under 35 U.S.C. 154(b) by 0 days.

(21) Appl. No.: 09/780,264

(22) Filed: Feb. 9, 2001

(65) Prior Publication Data

US 2001/0014107 A1 Aug. 16, 2001

(30) Foreign Application Priority Data

Feb. 10, 2000 (DE) .......................................... 100 06 050

(51) Int. Cl.$^7$ ................................................ H01S 3/10
(52) U.S. Cl. ............................ 372/26; 372/23; 372/12; 372/28; 372/31
(58) Field of Search ................. 372/23, 72, 29.014, 372/12, 97, 26, 68, 28, 29.023, 31

(56) References Cited

U.S. PATENT DOCUMENTS

| | | | |
|---|---|---|---|
| 3,582,819 A | | 6/1971 | Muller et al. |
| 3,857,109 A | * | 12/1974 | Pilloff ........................ 372/20 |
| 4,287,486 A | * | 9/1981 | Javan ......................... 372/20 |
| 5,117,126 A | * | 5/1992 | Geiger ....................... 359/330 |
| 5,708,672 A | * | 1/1998 | Pessot et al. ................. 372/23 |
| 6,078,606 A | * | 6/2000 | Naiman et al. ............... 372/97 |
| 6,385,215 B1 | * | 5/2002 | Sumiyoshi ..................... 372/6 |

FOREIGN PATENT DOCUMENTS

| | | |
|---|---|---|
| DE | 33 01 092 | 8/1983 |
| DE | 37 04 338 | 4/1995 |
| DE | 195 29 507 | 2/1996 |
| DE | 197 18 997 | 11/1998 |
| EP | 0 930 679 | 7/1999 |
| GB | 1 399 908 | 7/1975 |

OTHER PUBLICATIONS

German–English Technical and Engineering Dictionary by Dr. L. De Vries, p. 440, Reprint 1972.*
Article: Experiment 03, Gabry Perot Resonator, Didactic Counsellor Prof. Dr.– Ing. Dickmann, Fachhochschule Münster, Fachbereich Physikal. Technik, Dr. W. Luhs and W. Schubert MEOS Gmbh 79291 Merdingen, 1992.*

* cited by examiner

Primary Examiner—Jerome Jackson
Assistant Examiner—Matthew C. Landau
(74) Attorney, Agent, or Firm—Reed Smith LLP

(57) ABSTRACT

A directly modulatable laser comprising an active medium inside a laser cavity formed by a resonator mirror and an out-coupling mirror, and a pump light source exciting the active medium. It is characterized in that the active medium generates radiation of two wavelengths ($\lambda_1$ and $\lambda_2$) and the resonator mirror is constructed as a controllable reflector by which the reflectivity is controllable for each of the two wavelengths ($\lambda_1$ and $\lambda_2$) and the controllable reflector is connected with a control unit, wherein the reflection factor is controlled in such a way that the inversion density of the electrons which is generated in the active medium is constant and the light output of one of the wavelengths (($\lambda_1$) is controllable between a minimum value and a maximum value according to an applied control signal, wherein the control of the two wavelengths (($\lambda_1$ and $\lambda_2$) is carried out in push-pull.

13 Claims, 8 Drawing Sheets

DIRECTLY MODULATABLE LASER

BACKGROUND OF THE INVENTION a) Field of the Invention

The invention is directed to a directly modulatable laser comprising a laser medium inside a laser cavity.

The arrangement is used for direct modulation of the emission of a laser, particularly a solid state laser or fiber laser or a reamplified solid state laser or a reamplified fiber laser.

b) Description of the Related Art

Fiber lasers are known, for example, from R. G. Smith, *Appl. Opt.* 11, 2489 (772), H. Po, et al. 'High Power Neodymium-doped Single Transverse Mode Fibre Laser', *Electronics Letters,* Vol. 29, No. 17, p 1500 (793) and P. Urquhart 'Review of rare earth doped fibre lasers and amplifiers', *IEE Proceedings,* Vol. 135, Pr. J, No. 6, December (788). In order to modulate the light emission of a fiber laser, it is possible to modulate the light output of the pump light source. However, with this method only modulation frequencies below the relaxation frequency of the fiber laser can be achieved, namely, in general, only several tens to hundreds of kilohertz. Modulation can be improved by continuous pumping of the fiber laser and reamplification of a rapidly modulatable external signal source at the emission wavelength of the fiber laser (seed) in the laser fiber.

The rapidly modulatable signal source can be effected from a laser diode modulated by the injection flow, a Q-switched laser or continuous-wave laser with intensity modulators in the light path between the signal light source and the fiber laser. However, this method leads to low modulation depths because the amplified spontaneous emission (ASE) of the fiber laser leads to a reduction in contrast when the signal light source is switched off. Further, a temporary exaggerated or elevated power of the output signal occurs when the signal light source is switched on after a long dark period because of the elevated inversion in the active fiber which builds up during the dark period.

This can be prevented by a two-wavelength, two-polarization or two-direction method described in the German Patent Application DE 198 29 684 A1. The fiber amplifier is kept constantly in saturation by switching over or modulating emission light of two wavelengths, two polarizations or two radiating directions through the fiber laser in such a way that the sum of the two light outputs remains constant. In this way, unwanted ASE is completely suppressed and high contrast is achieved. An inversion elevation after dark periods is prevented. The switching over or modulation of the signal light is carried out by modulating the injection flow of two laser diodes serving as seeds.

The disadvantage in this method is that the emission wavelengths of the signal source and fiber laser must match. This is not always possible when using a diode laser as signal source, particularly in the visible spectral range. Further, coupling two laser diodes into a monomode fiber requires complicated opto-mechanical precision elements. It is not possible to provide compact, adjustment-free systems comprising pump light sources, changeover switches or modulators and fiber lasers.

OBJECT AND SUMMARY OF THE INVENTION

It is the primary object of the invention to provide a compact component group as a combination of a solid state laser or fiber laser or reamplified solid state laser or reamplified fiber laser and an internal modulation arrangement which is capable of delivering intensity-modulated laser light up to extremely high modulation frequencies and high light outputs. Further, the invention should solve the problem of insufficient output strength of individual components of modulatable solid state lasers, fiber lasers and amplifiers. Further, a modulation of the light of at least one wavelength should be carried out in such a way that its intensity curve follows the applied electric modulation function more accurately than was possible heretofore.

The invention relates to a directly modulatable laser comprising an active medium inside a laser cavity formed by a resonator mirror and an out-coupling mirror, and a pump light source exciting the active medium.

The invention is characterized, in a first instance, in that the active medium generates radiation of two wavelengths $\lambda_1$ and $\lambda_2$ and the resonator mirror is constructed as a controllable reflector by which the reflectivity is controllable for each of the two wavelengths $\lambda_1$ and $\lambda_2$ and the controllable reflector is connected with a control unit, wherein the reflection factor is controlled in such a way that the inversion density of the electrons which is generated in the active medium is constant and the output of one of the wavelengths is controllable between a minimum value and a maximum value according to an applied control signal E, wherein the control of the two wavelengths $\lambda_1$ and $\lambda_2$ is carried out in push-pull. This arrangement is also known as a directly modulatable laser according to the two-wavelength method.

In a first construction, the two emission wavelengths are generated in a broad-band amplifying medium, wherein these emission wavelengths are selected by the configuration, according to the invention, of the laser resonator or cavity.

In a second construction, the two emission wavelengths are generated in an active medium amplifying on two different lines.

The invention is described in this case only for two wavelengths. Of course, the directly modulatable laser can also be operated with three or more wavelengths, wherein the basic ideas of the invention must be utilized. Accordingly, in this case, the fiber laser is operated with two wavelengths. Because of the wavelength-selective characteristics of the reflectors, the resonance condition in the laser is given only for the wavelengths that are predetermined by the construction of the reflectors. The laser accordingly emits only on these two wavelengths. The amplification factor is adjusted by means of controlling the reflection factor, this control being independent for both wavelengths. In general, the control can be carried out in such a way that the sum of the emission outputs of the two wavelengths is constant.

The controllable reflector is used in this case as a wavelength-selecting resonator mirror of the laser or of a reamplified laser. The controllable reflector contains at least one modulator for the phase position and/or the polarization and/or the optical power of two light components. The effect or action of an intensity modulation for the two emission wavelengths or for only one of these wavelengths can be utilized at the output of the laser or reamplified laser.

The two emission wavelengths are not taken from external signal sources in this case, but from the active-ion doped laser fibers themselves, whose wavelength spectrum encompasses both emission wavelengths, or an actively doped fiber is used which can emit two discrete wavelengths. The amounts of the two emission wavelengths are determined in the two-wavelength method by the construction of the wavelength-selecting resonator mirror and the emission spectrum of the active fiber.

In a second instance, the invention is characterized in that the active medium generates radiation of a wavelength with two polarization directions $P_1$ and $P_2$ and the resonator mirror is constructed as a controllable reflector by which the reflectivity is controllable for each of the two polarizations $P_1$ and $P_2$ and the controllable reflector is connected with a control unit, wherein the control of the reflection factor is carried out in such a way that the inversion density of the electrons which is generated in the active medium is constant and the output of one of the polarizations is controllable between a minimum value and a maximum value according to an applied control signal, wherein the control of the two polarization directions $P_1$ and $P_2$ is carried out in push-pull.

This arrangement is also known as a directly modulatable laser according to the two-polarization method.

The controllable reflector is used in this case as a polarization direction-selecting resonator mirror of the laser or of the reamplified laser. The controllable reflector contains at least one modulator for the phase position and/or the polarization and/or the optical power of two light components.

The effect of a polarization modulation can be utilized for the two emission wavelengths or for only one of these wavelengths at the output of the laser or of the reamplified laser.

In the two-polarization method, two polarizations of the emitted light can be taken from an unpolarized active fiber which can be designed as polarization-preserving or non-polarization-preserving fibers. In the latter case, it may be required to monitor the double refraction or birefringence of the fiber.

In a third case, the invention is characterized in that the active medium generates radiation of one wavelength and the resonator mirror and out-coupling mirror are constructed in each instance as controllable reflectors by which the direction $R_1$ and $R_2$ of the light radiation is controllable and each of the controllable reflectors is connected with a control unit, wherein the control of the reflection factor is carried out in such a way that the inversion density of the electrons which is generated in the active medium is constant and the output of one of the directions is controllable between a minimum value and a maximum value according to an applied control signal, wherein the control of the two directions $R_1$ and $R_2$ is carried out in push-pull.

This arrangement is also called a directly modulatable laser according to the two-direction method.

A solid body or a light-conducting fiber is particularly suitable as active medium. However, dyes or gases can also be used as active media.

An advantageous construction of the directly modulatable lasers consists in that the selection of the two wavelengths $\lambda_1$ and $\lambda_2$ or of the two polarizations $P_1$ and $P_2$ is carried out after the output of the laser, i.e., after the light components have exited the laser cavity through the out-coupling mirror.

In a further development of the directly modulatable laser, the modulated laser light is reamplified in a solid state amplifier or fiber amplifier.

Also, with reamplification of the laser light, it is advantageous that the selection of the two wavelengths $\lambda_1$ and $\lambda_2$ or of the two polarizations $P_1$ and $P_2$ is carried out after the output of the amplifier stage.

In a further development of the invention, the resonator mirror and the out-coupling mirror are constructed as wavelength-selective or polarization-selective controllable reflectors and the active medium generates radiation of two wavelengths $\lambda_1$ and $\lambda_2$ or the active medium generates radiation of one wavelength with two polarization directions $P_1$ and $P_2$. This arrangement is a directly modulatable laser in which the two-wavelength method or the two-polarization method is combined with the two-direction method.

The controllable reflector is constructed as a volume-optical or integrated-optical component.

The invention accordingly relates to a directly modulatable laser and a directly modulatable reamplified laser in which at least one of the two mirrors forming the laser cavity is constructed as a controllable reflector. The controllable reflector serves as a wavelength changeover switch for the two-wavelength method, as a polarization changeover switch for the two-polarization method or as a light modulator for the two-direction method. In the two-wavelength method and two-polarization method, preferably only the resonator mirror is constructed as a controllable reflector. However, both mirrors of the laser cavity can also be constructed so as to be controllable.

In the two-direction method, the resonator mirror and the out-coupling mirror must be constructed so as to be controllable. When these two mirrors are constructed in such a way that they are wavelength-switchable or polarization-switchable, a combined effect of the methods is achieved in that the modulation depth is improved.

When using miniaturized or integrated-optical controllable reflectors, extremely high modulation frequencies of up to about 40 GHz and modulation depths of up to 40 dB can be achieved.

Both emission wavelengths or emission polarizations or emission directions are accordingly not supplied from external radiation sources, but rather are taken from the active ion-doped laser medium itself. In this regard, it must be ensured that the electron transition from the upper laser level to the lower laser level(s) is constant over time. This is equivalent to the demand that the inversion density is also constant over time.

The control of the electron transition is carried out in the two-wavelength method by controlling the individual electron transitions on the two selected emission wavelengths, in the two-polarization method by controlling the two polarizations, and in the two-direction method by controlling the light components of the two emission directions.

The amounts of the two emissions are given by the construction and control of the controllable reflectors and the emission spectrum of the active medium.

As a rule, one of the two emission wavelengths or emission polarizations or emission directions is used and the other is absorbed in a radiation trap. However, both emissions of the directly modulatable laser can also be utilized.

Further, by means of subsequent arrangement of an amplifier which, if required, is separated from the laser, e.g., by means of a Faraday isolator, it is possible to modulate both emission wavelengths or emission polarizations at low optical power (milliwatt range), to amplify them in the subsequent amplifier, and then to separate the utilized component from the component that is not utilized. A possible power limiting of the reflector components is avoided in this way and the high-power range of several watts can be included. Due to the fact that the amplifier is constantly kept in saturation by the two-wavelength operation or two-polarization operation, a particularly high contrast ratio can be achieved since the amplified spontaneous emission is also suppressed in the amplifier. The separation of the two emission wavelengths or emission polarizations is carried out at the amplifier output.

By constructing the laser as a fiber laser, the amplifier as a light-conducting fiber amplifier and the controllable reflectors as integrated-optical or miniaturized-optical components, a high degree of integration can be achieved and the component group or subassembly is essentially not prone to interference and requires no adjustment.

The controllable reflector is based, for example, on one of the following principles which are controllable: interferometer, absorber, light-path switching based on electro-optical, acousto-optical, thermo-optical, photothermal modulation or injection or depletion of charge carriers in waveguides. Further, liquid-crystal modulators are used. Another possibility is the generation of a periodic change in the geometric shape of the waveguide, e.g., as controllable amplitude gratings.

In particular, it is extremely advantageous that the controllable reflector(s) is (are) optically coupled directly with one end of a fiber laser or fiber amplifier, or two of these controllable reflectors are optically coupled respectively with one of the two ends of a fiber laser.

The invention will be explained more fully in the following with reference to the Figures.

DESCRIPTION OF THE PREFERRED EMBODIMENTS

Figure 1:
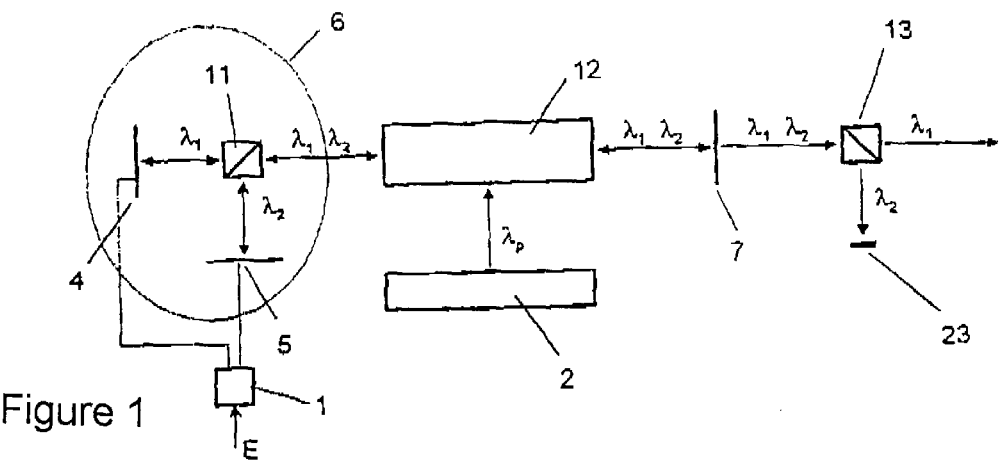
FIG. 1 shows a directly modulatable laser in the two-wavelength method.

FIG. 1 shows the basic construction of a modulatable laser in volume-optical construction in the two-wavelength method. Light from the pump light source 2 with wavelength $\lambda_P$ is radiated into the active medium 12. This can be carried out transversely or longitudinally, for example. The active medium 12 is capable of emitting two different wavelengths $\lambda_1$ and $\lambda_2$. These wavelengths $\lambda_1$ and $\lambda_2$ can be taken from a spectral band of the emission, e.g., Nd-glass delivers an emission between 1.06 $\mu$m and 1.065 $\mu$m, e.g., 1.062 $\mu$m and 1.064 $\mu$m, or the active medium supplies two narrow-band emission lines, e.g., PrYb-glass supplies 635 m and 725 nm.

A first wavelength splitter 11 which is constructed, e.g., as a dichroic mirror, is arranged at one end of the active medium 12. Each of the two wavelengths $\lambda_1$ and $\lambda_2$ is guided to a reflector 4 and 5, respectively, whose reflectivity is controllable and which, in their entirety, together with the wavelength splitter 11, form a first resonator mirror which is a controllable resonator mirror 6. The controllable reflectors 4 and 5 are constructed, e.g., as Fabry-Perot resonators whose respective cavity is composed entirely or partially of an electro-optic medium, by means of whose refractive index the reflection factor of every reflector can be controlled.

At the other end of the active medium 12, an out-coupling mirror 7 is arranged as second resonator mirror. Together with the active medium, the controllable resonator mirror 6 and the out-coupling mirror 7 define a laser cavity. The emitted light of wavelengths $\lambda_1$ and $\lambda_2$ is split by a second wavelength splitter 13. The light of wavelength $\lambda_2$ which is not utilized in the example is absorbed in a radiation trap 23.

The controllable reflectors 4 and 5 are controlled through a control unit 1 by an input signal E in such a way that the laser emits simultaneously on both wavelengths $\lambda_1$ and $\lambda_2$ and the inversion density in the active medium 12 is constant (two-wavelength method). The light of wavelength $\lambda_1$ can accordingly be modulated in intensity from zero to a maximum value and is available for further processing.

Figure 2:
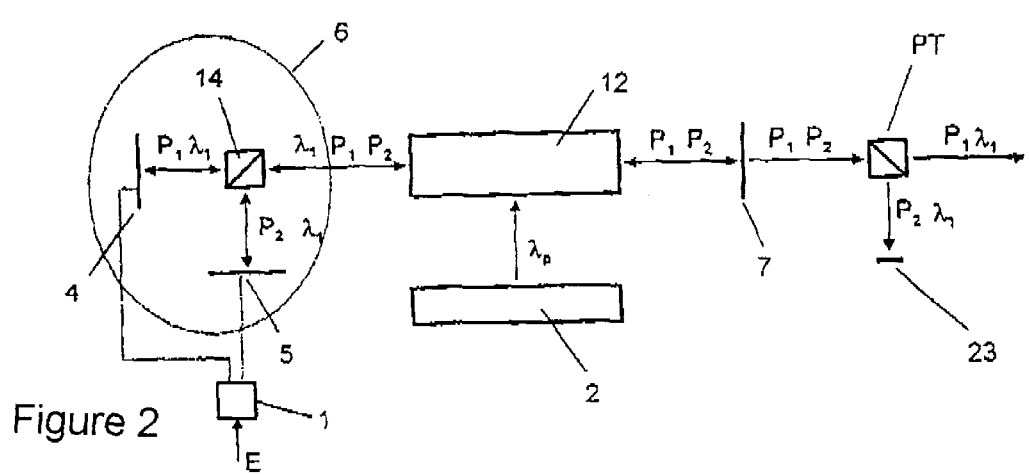
FIG. 2 shows a directly modulatable laser in the two-polarization method.

FIG. 2 shows the basic construction of a modulatable laser in volume-optical construction in the two-polarization method. Light from the pump light source 2 with wavelength $\lambda_P$ is radiated into the active medium 12. This can be carried out transversely or longitudinally, for example. The active medium is only capable of emitting wavelength $\lambda_1$ but with the polarization directions $P_1$ and $P_2$ offset by 90°.

A first polarization splitter 14 which is constructed, e.g., as a birefringent crystal, is arranged at one end of the active medium 12. One of the two polarizations $P_1$ or $P_2$ is guided in each instance to a reflector 4 or 5 which is controllable with respect to its reflectivity and which, in their entirety together with the polarization beam splitter 14, form a first resonator mirror 6. The out-coupling mirror 7 is arranged at the other end of the active medium 12. The emitted light of wavelength $\lambda_1$ with polarization directions $P_1$ and $P_2$ is split by a second polarization splitter 15. The light of polarization $P_2$ that is not utilized is absorbed in a radiation trap 23. The light with polarization $P_1$ is the useful light.

The controllable reflectors 4 and 5 are controlled in such a way that the laser emits simultaneously on both polarizations $P_1$ and $P_2$ and the inversion density in the active medium 12 is constant.

Figure 3:
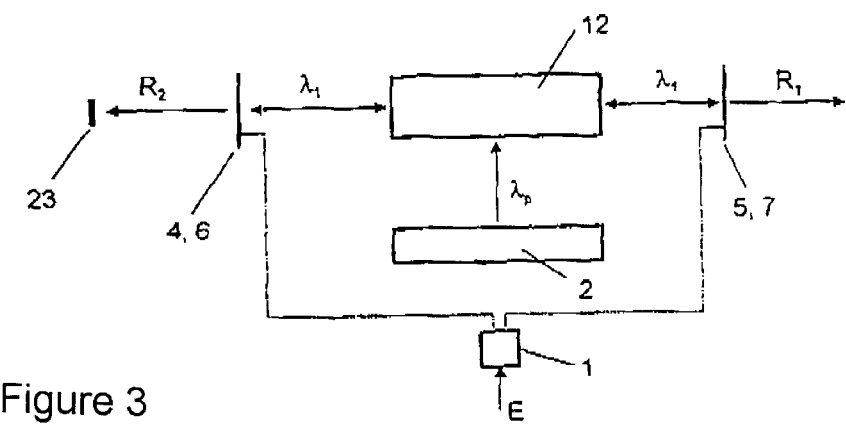
FIG. 3 shows a directly modulatable laser in the two-direction method.

FIG. 3 shows the basic construction of a modulatable laser in volume-optical construction in the two-direction method. Light from the pump light source 2 with wavelength $\lambda_P$ is radiated into the active medium 12. This can be carried out, for example, transversely or longitudinally. The active medium is capable of emitting on wavelength $\lambda_1$.

The controllable reflector 4 is arranged at one end of the active medium 12 as controllable resonator mirror 6 and the controllable reflector 5 is arranged at the other end of the active medium 12 as controllable out-coupling mirror 7. The reflectors 4 and 5 can be constructed, e.g., as Fabry-Perot resonators whose cavity is composed entirely or partially of an electro-optic medium by means of whose refractive index the reflection factor of the reflector is controlled.

The controllable reflectors 4 and 5 are controlled in such a way that the laser emits simultaneously in both directions $R_1$ and $R_2$ with varying power ratio and the inversion density in the active medium 12 is constant. The light of direction $R_2$ that is not utilized is absorbed in a radiation trap 23. The controllable reflector 4 serves simultaneously as an out-coupling mirror 7 and the light of direction $R_1$ is therefore the useful light with wavelength $\lambda_1$.

Figure 15:
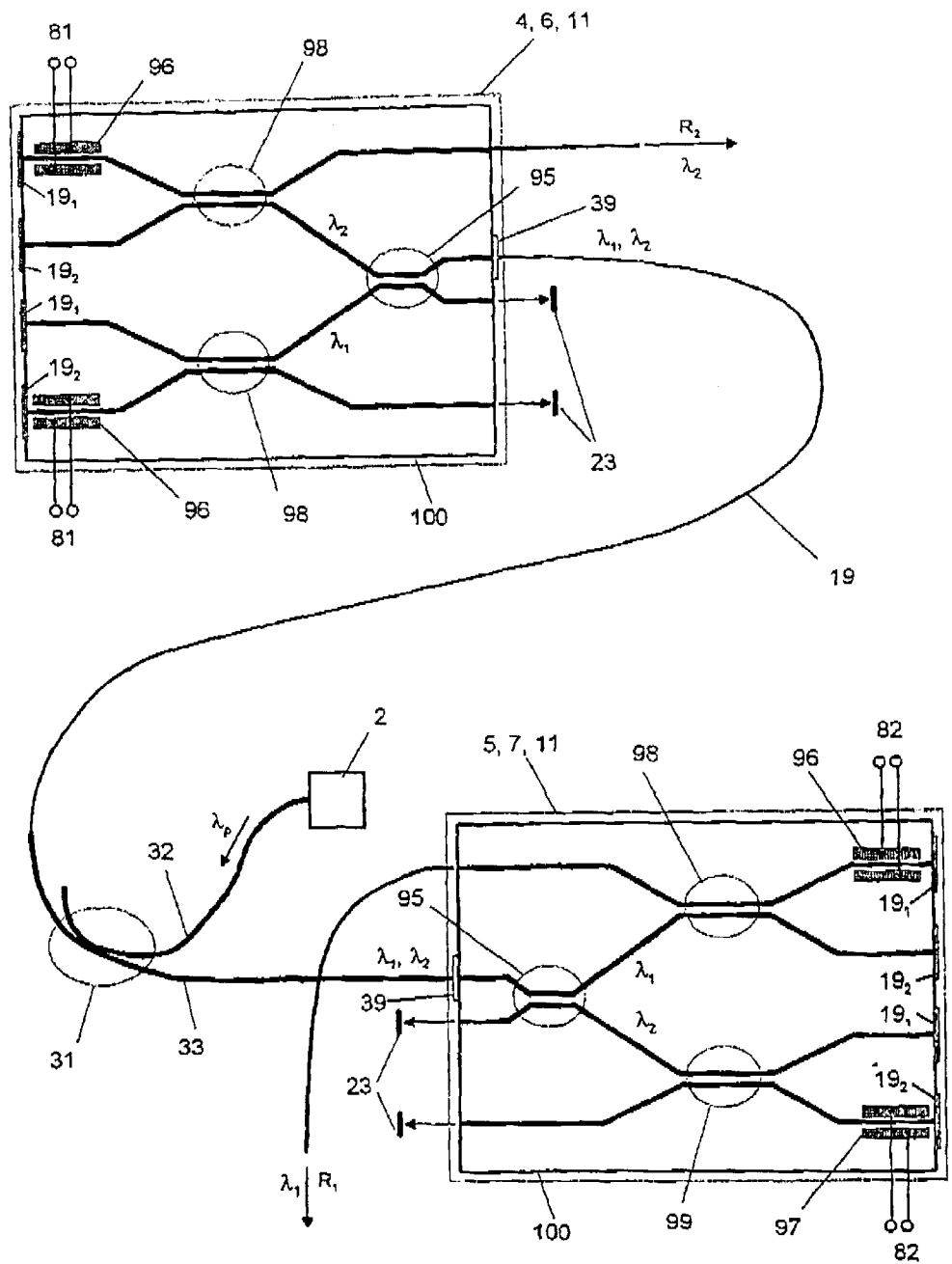
FIG. 15 shows a directly modulatable solid state laser with controllable reflectors according to a combined two-wavelength/two-direction method with two coupled strip waveguide interferometer reflectors.

A further development of the two-direction method consists in that it is combined with the two-wavelength method according to FIG. 1 or with the two-polarization method according to FIG. 2 (see also FIG. 15). The laser cavity is then formed by a controllable wavelength-selective or polarization-dependent reflector 2 and 5. In the event that the controllable wavelength-selective reflector 4 is switched off, the laser emits on the wavelength $\lambda_2$ given by the controllable wavelength-selective reflector 5 or polarization direction $P_2$ in the reverse direction $R_2$ (toward the left). When the controllable wavelength-selective reflector 4 is switched on, the fiber laser emits on the wavelength $\lambda_1$ given by the controllable wavelength-selective reflector 4 or polarization direction $P_1$ in the forward direction $R_1$ (toward the right).

Figure 4:
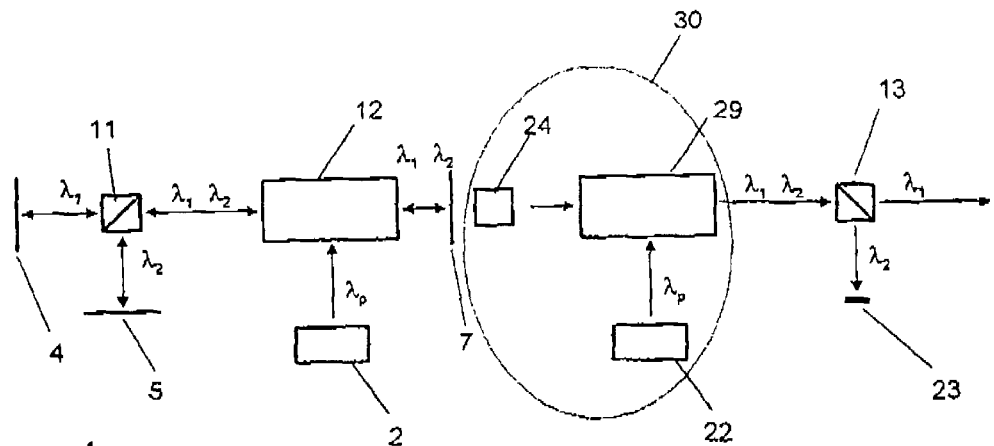
FIG. 4 shows a directly modulatable reamplified laser in the two-wavelength method.

FIG. 4 shows the basic construction of a modulatable laser in volume-optical construction in the two-wavelength method according to FIG. 1 with an amplifier stage 30 added between the out-coupling mirror 7 and the second wavelength splitter 13.

The laser from FIG. 1 generating two wavelengths with the active medium 12 is separated from an amplifier medium 29 by an optical isolator 24 (e.g., a Faraday isolator or spectral filter). The amplifier medium 29 is pumped by another pump light source 22.

The pump light of the pump light source 2 for the active medium 12 and the modulated light in the laser cavity have a low optical power. Therefore, there are no extreme demands placed on the controllable reflectors 4 and 5 with respect to output strength.

Both wavelengths of the laser light are amplified in the amplifier 30 by means of the high-power pump light from the pump light source 22. The optical isolator 24 prevents the power-amplified light component and the pump light from reflecting back into the laser cavity. This effectively prevents power-related destruction of the components of the laser. The second wavelength splitter 13 separates the utilized wavelength $\lambda_1$ from the wavelength $\lambda_2$ that is not utilized.

Figure 5:
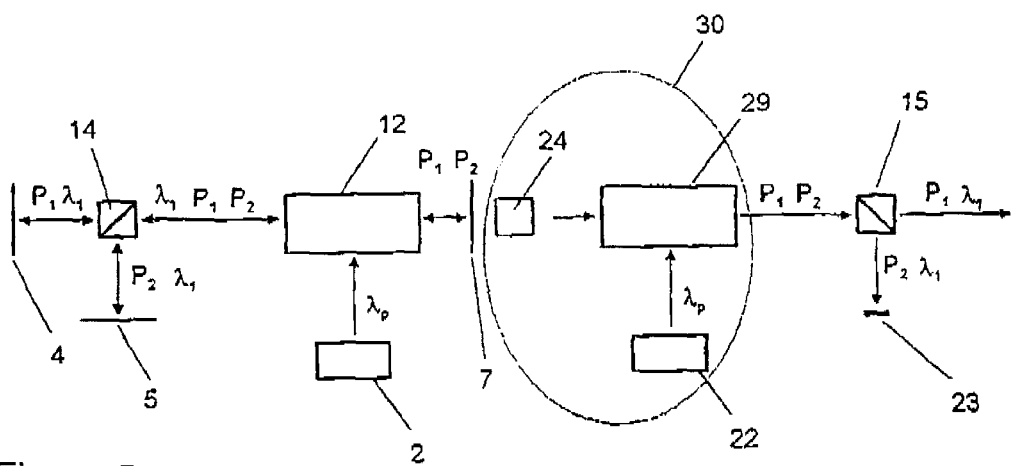
FIG. 5 shows a directly modulatable reamplified laser in the two-polarization method.

FIG. 5 shows the basic construction of a modulatable laser in volume-optical construction in the two-polarization method with the added amplifier stage 30. The laser from FIG. 2 generating two polarization directions and with the active medium 12 is separated from the amplifier medium 29 by an optical isolator 24. The pump light of the pump light source 2 and the modulated light inside the cavity of the laser have a low optical power. The remarks pertaining to FIG. 4 apply in analogous manner. The polarization splitter 15 separates the light of the utilized polarization direction $P_1$ from the light of the polarization direction $P_2$ that is not utilized.

Figure 6:
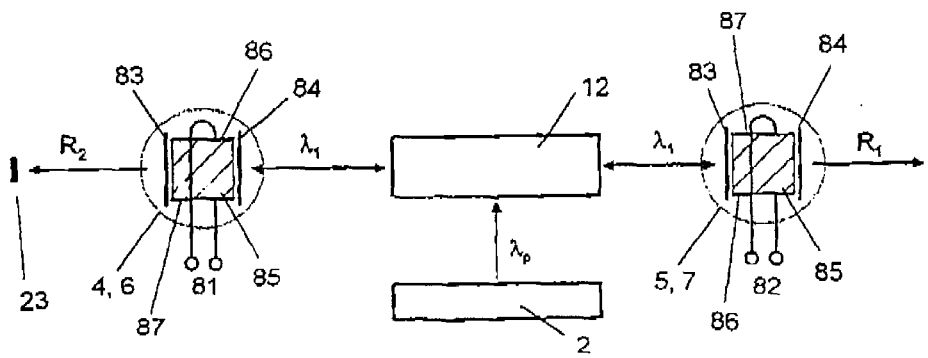
FIG. 6 shows a directly modulatable solid state laser with controllable reflectors according to the two-direction method, with solid state modulators.

FIG. 6 shows a construction of a modulatable laser in volume-optical construction in the two-direction method according to FIG. 3. Light from the pump light source 2 with wavelength $\lambda_P$ is radiated into the active medium 12. This can be carried out transversely, for example. The active medium 12 is capable of emitting on wavelength $\lambda_1$. A controllable reflector 4, 5 is arranged at both ends of the active medium and forms the resonator mirrors 6 and 7. The controllable reflector 4, 5 comprises two individual mirrors 83 and 84 which form a Fabry-Perot interferometer. A medium 85 having the linear electro-optic effect, for example, lithium niobate or potassium dihydrogen phosphate, is arranged between the two mirrors 83 and 84.

An electric field is applied to the electro-optic medium 85, this electric field being generated by two electrodes 86 and 87 to which, respectively, one of the control voltages 81 and 82 is applied. This field causes a change in the refractive index of the electro-optic medium 85.

Depending on the refractive index of the electro-optic medium 85, i.e., the control voltage 81, 82, the transmittance or reflection factor of the Fabry-Perot interferometer, i.e., of the controllable resonator mirror 6 and out-coupling mirror 7, can be adjusted in oppositely directed manner between zero and a maximum value.

The controllable reflectors 4 and 5 are controlled in such a way that the laser emits simultaneously in both directions $R_1$ and $R_2$ with varying power ratio and the inversion density in the active medium 12 is constant. The light of direction $R_2$ that is not utilized is absorbed in a radiation trap 23.

Figure 7:
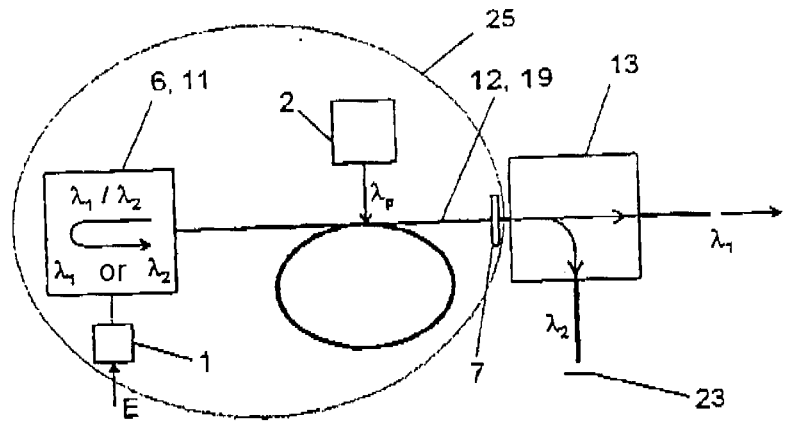
FIG. 7 shows a directly modulatable fiber laser in the two-wavelength method.

FIG. 7 shows the basic construction of a modulatable fiber laser 25 corresponding to the two-wavelength method analogous to FIG. 1. Light from the pump light source 2 with wavelength $\lambda_P$ is coupled into the active Nd-doped fiber 19. The coupling in of the pump light can be carried out by transverse coupling (e.g., by means of fiber gratings), by longitudinal coupling (e.g., by means of lenses in the end face) or by connection splitters in fiber-optic, integrated-optic, micro-optic or miniaturized-optic construction. One end of the active fiber 19 is connected with the controllable resonator mirror 6. This makes it possible to modulate the light inside the laser cavity in such a way that the inversion density in the active medium 12 is constant, i.e., as the light output of wavelength $\lambda_1$ increases, the light output of wavelength $\lambda_2$ decreases correspondingly, or vice versa. An out-coupling mirror 7 is located on the cross section at the second end of the active fiber 19. This is optically connected with the wavelength splitter 13 which separates the wavelength $\lambda_1$ to be utilized from the wavelength $\lambda_2$ that is not utilized. The latter is absorbed in the radiation trap 23.

Figure 8:
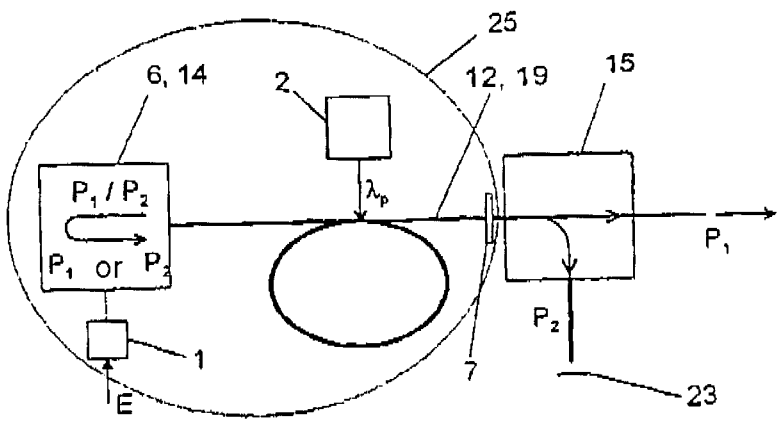
FIG. 8 shows a directly modulatable fiber laser in the two-polarization method.

FIG. 8 shows the basic construction of the modulatable fiber laser 25 corresponding to the two-polarization method analogous to FIG. 2. Light from the pump light source 2 with wavelength $\lambda_P$ is coupled into the active Pr/Yb-doped fiber 19. One end of the active fiber 19 is connected with the controllable reflector 6. This reflector makes it possible to modulate the emitted signal light in such a way that the inversion density in the active medium 12 is constant, i.e., as the light output of polarization $P_1$ increases, the light output of polarization $P_2$ decreases, or vice versa. The out-coupling mirror 7 is arranged on a second end of the fiber 19. The second end of the active fiber 19 is connected with the polarization splitter 15 which separates the light of the polarization $P_1$ to be utilized from the light of the polarization $P_2$ that is not utilized. The latter is absorbed in the radiation trap 23.

Figure 9:
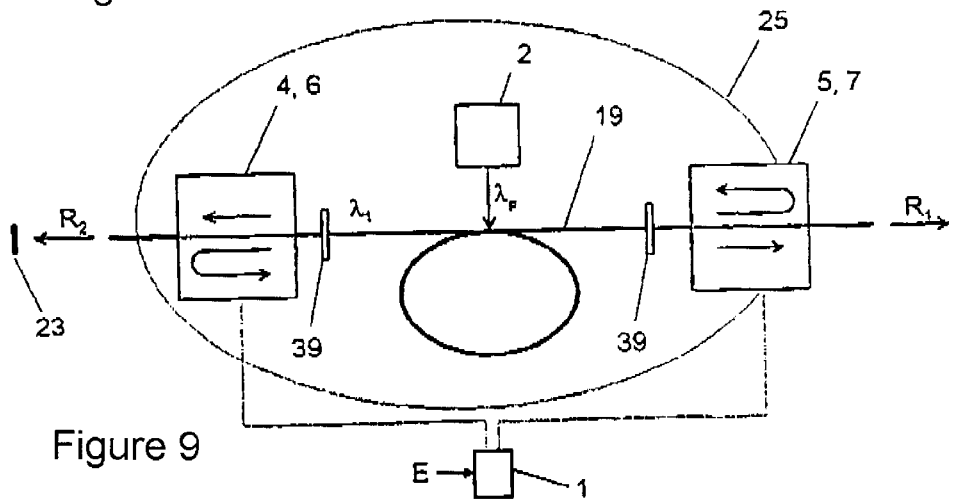
FIG. 9 shows a directly modulatable fiber laser in the two-direction method.

FIG. 9 shows the basic construction of the modulatable fiber laser 25 corresponding to the two-direction method analogous to FIG. 3. The fiber laser is outfitted with a controllable reflector 4, 5 at each end of the fiber. In case the controllable reflector 4 is switched off, the fiber laser emits on the wavelength $\lambda_1$ given by the controllable reflector 5 in the reverse direction $R_2$ (toward the left). In case the controllable wavelength-selective reflector 4 is switched on, the fiber laser emits to the degree given by the controllable reflector 5 in the forward direction $R_1$ (toward the right). The controllable reflectors of the fiber laser are connected in push-pull and operate on the same wavelength $\lambda_1$, so that the fiber laser emits to a determined degree in the forward and reverse directions, wherein the inversion density in the active medium 12 is kept constant. Further, it is advantageous to provide reflectors 29 for the pump light at the outputs of the fiber laser.

Figure 10:
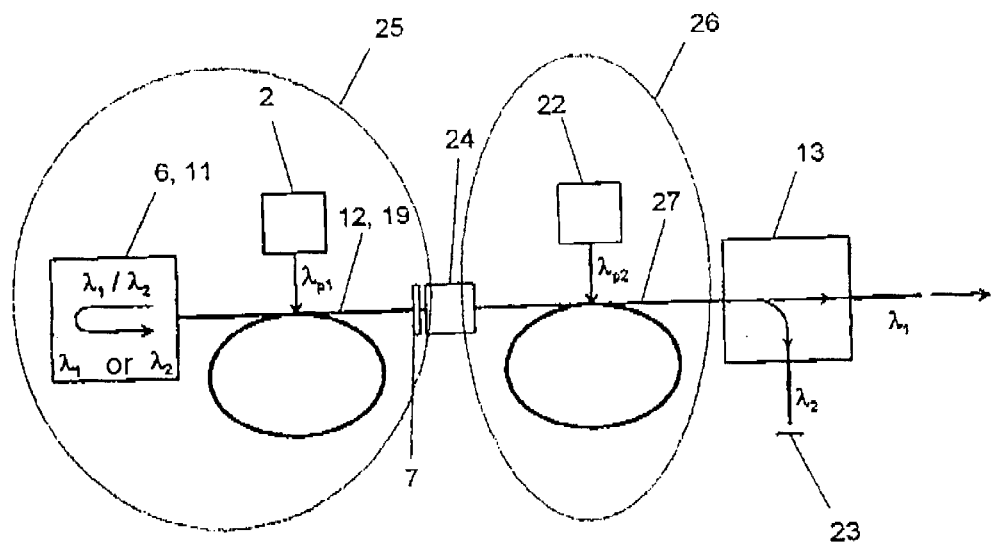
FIG. 10 shows a directly modulatable reamplified fiber laser in the two-wavelength method.

FIG. 10 shows a modulatable fiber laser in the two-wavelength method with subsequent amplifier stage analogous to FIG. 4. The laser 25 from FIG. 6 generating two wavelengths and with active medium 19 is separated from a fiber amplifier 26 with the other active fiber 27 by the optical isolator (e.g., a Faraday isolator or spectral filter). The pump light of the pump light source 2 and the modulated light of the fiber laser have a low optical power. Therefore, there are no extreme requirements placed on the controllable reflector with respect to output strength. Both wavelengths $\lambda_1$ and $\lambda_2$ of the laser light are amplified in the fiber amplifier 26 by means of the high-power pump light from the pump light source 22. The optical isolator 24 prevents the back-radiation of high-power light into the fiber laser 25 and accordingly prevents power-related destruction of the components of the fiber laser. The wavelength splitter 13, a dichroic beam splitter, separates the utilized light from the light that is not utilized.

Figure 11:
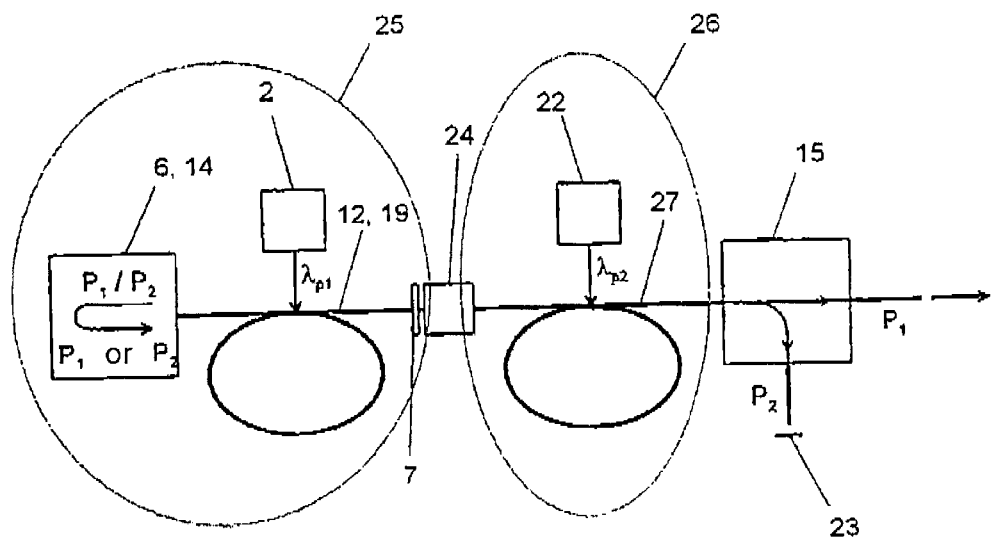
FIG. 11 shows a directly modulatable reamplified fiber laser in the two-polarization method.

FIG. 11 shows a modulatable fiber laser in the two-polarization method with subsequent amplifier stage analogous to FIG. 5. The laser from FIG. 8 generating two polarization directions and with the active fiber 19 is separated from the fiber amplifier 26 with the active fiber 27 by the optical isolator 24. The two polarizations of the laser light $P_1$ and $P_2$ are amplified in the fiber amplifier 26 by means of the high-power pump light from the pump light source 22. The polarization splitter 15 separates the emitted signal light that is utilized from the emitted signal light that is not utilized.

Figure 12:
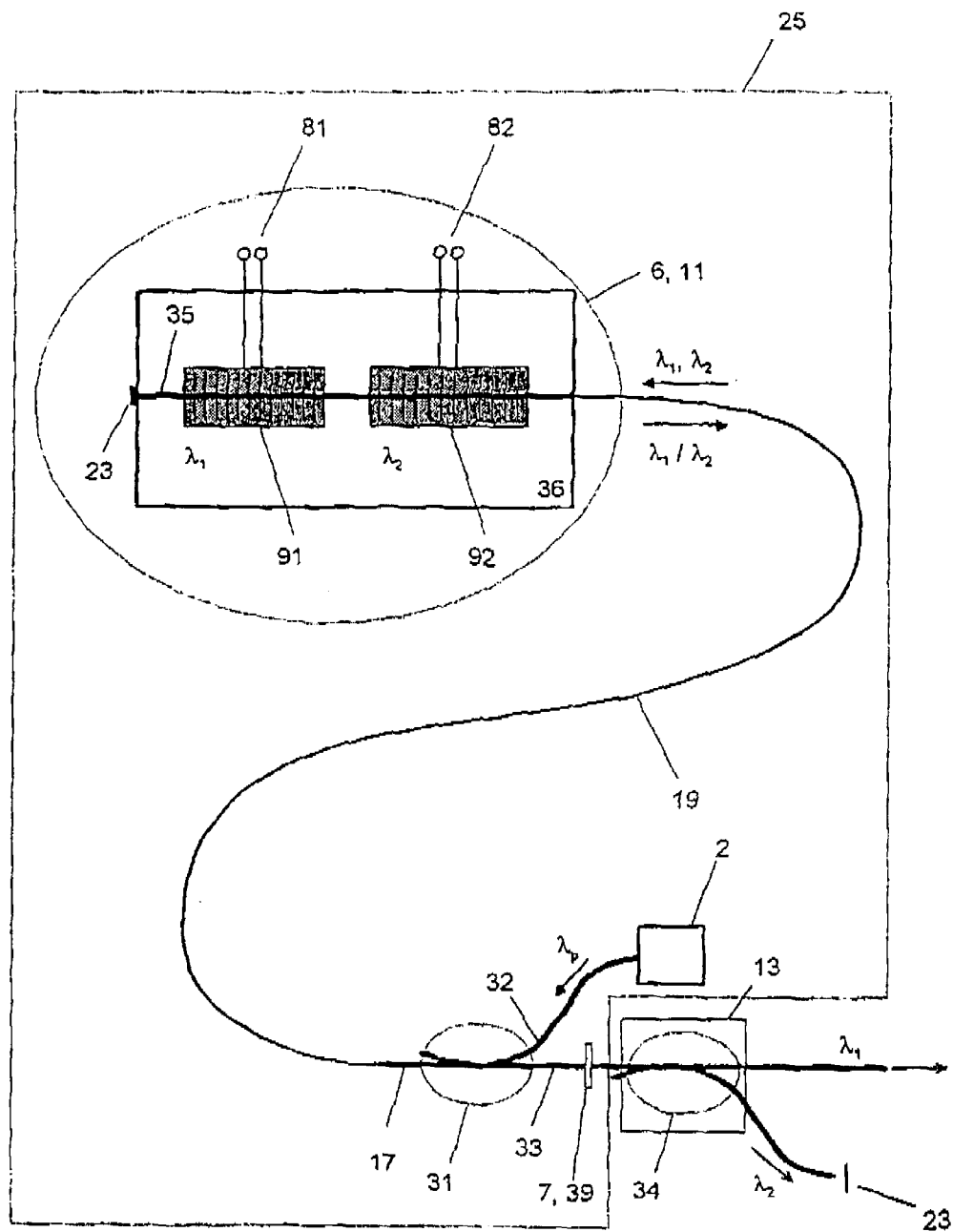
FIG. 12 shows a directly modulatable fiber laser with controllable reflector according to the two-wavelength method with a coupled Bragg reflector.

FIG. 12 shows a detailed overall construction of a modulatable fiber laser according to the two-wavelength method according to FIG. 7. One end of the active fiber 19 is coupled with another fiber 17 containing a fiber fused coupler 31 constructed as a wavelength multiplexer. The latter serves to couple the pump light of wavelength $\lambda_P$ from the pump light source 2 through a pump light branch 32 into the active fiber 19. During this passage, the active fiber 19 is excited and emits light (signal light) on the wavelengths $\lambda_1$ and $\lambda_2$ predetermined by the doping. This light propagates in the active fiber and, at the other end of the active fiber 19, impinges on the controllable resonator mirror 6 by which the reflection factor is controlled separately for two wavelengths $\lambda_1$ and $\lambda_2$. The feedback of the fiber laser is accordingly controlled and the laser process is completed only for the wavelengths for which a high reflectivity is adjusted by means of the control signals 81 and 82.

In the example, the controllable resonator mirror 6 comprises two controllable waveguide Bragg reflectors 91 and 92 arranged in tandem at an integrated-optical waveguide 35 arranged on a substrate 36. The waveguide 35 is optically coupled to the active fiber 19. The controllable waveguide Bragg reflectors 91 and 92 have a very narrow-band reflectance spectrum, i.e., in driven state only one wavelength is reflected by each grating or is filtered out of spectral broad-band light by reflection. The period of the controllable waveguide Bragg reflectors 91 and 92 is dimensioned in such a way that wavelength $\lambda_1$ is reflected in waveguide Bragg reflector 91 and wavelength $\lambda_2$ is reflected in waveguide Bragg reflector 92. The reflectivity of the Bragg reflectors 91 and 92 is controlled by controlling the refractive index modulation in the Bragg grating. For this purpose, in the example, the acousto-optical effect is utilized.

When waveguide Bragg reflector 92 is driven, the light of wavelength $\lambda_2$ is reflected totally or partially corresponding to the control signal 82, while light of wavelength $\lambda_1$ can pass this reflector without being affected. When waveguide Bragg reflector 91 is driven, the light of wavelength $\lambda_1$, is reflected totally or partially corresponding to control signal 81, while light of wavelength $\lambda_2$ that has passed the reflector 92 can also pass reflector 91 without being affected. Light components that are not reflected are guided further in the waveguide and can be emitted or are absorbed in a radiation trap 23. Therefore, wavelengths $\lambda_1$ and $\lambda_2$ can be filtered out of the wavelength spectrum of the pump light source 2 in a selectively controllable manner and the intensity of the light of two wavelengths $\lambda_1$ and $\lambda_2$ can be modulated.

The emitted signal light of wavelengths $\lambda_1$ and/or $\lambda_2$ pass further through a signal light branch 33 of the fiber fused coupler 31. In this case, the wavelength splitter 13 is a second fiber fused coupler 34 constructed as a wavelength demultiplexer. The latter separates the wavelengths $\lambda_1$ and $\lambda_2$. The wavelength $\lambda_2$ that is not utilized is absorbed in the radiation trap 23. If required, a pump light reflector 39 can be arranged in the signal light branch 33.

Figure 13:
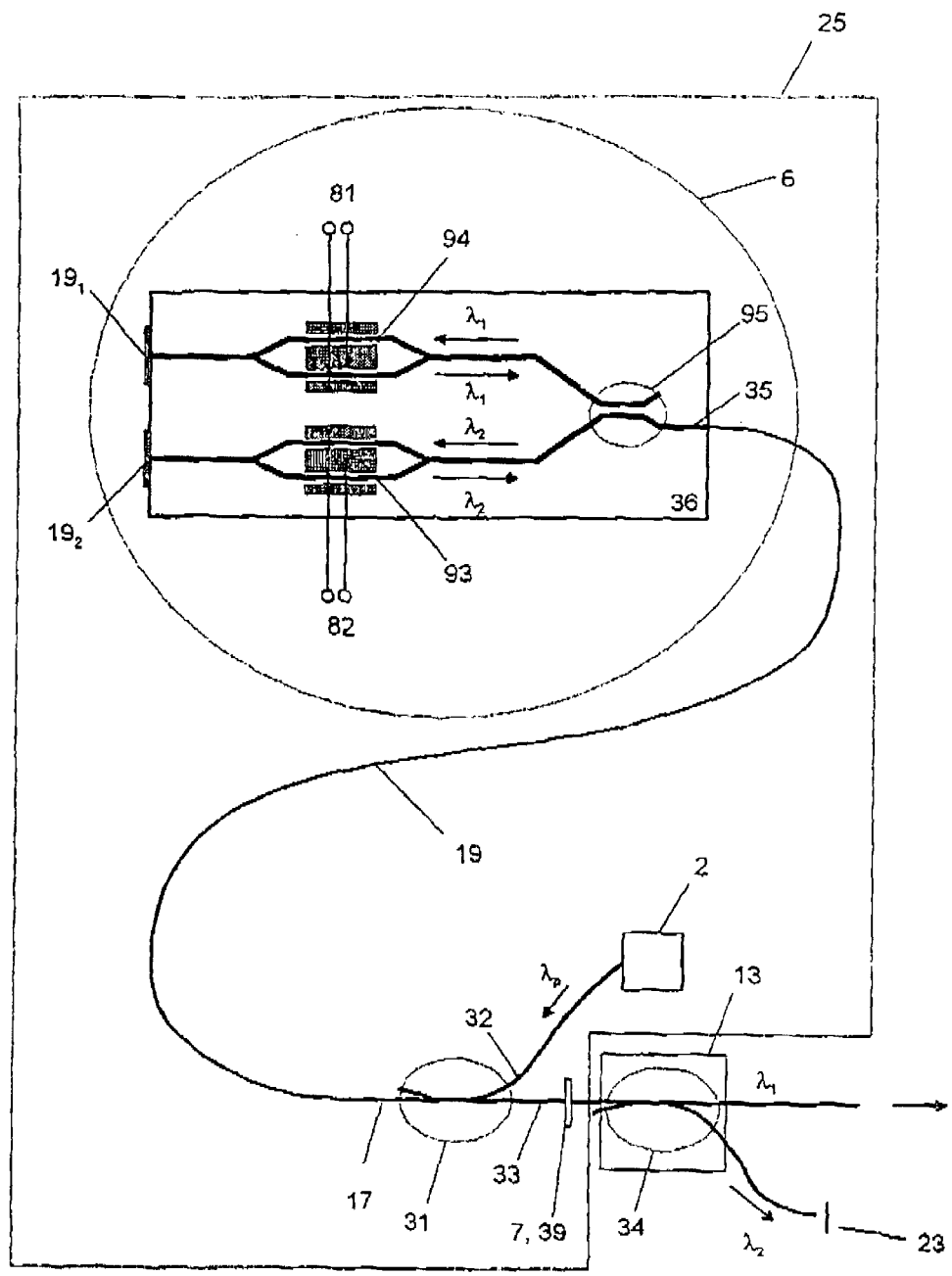
FIG. 13 shows a directly modulatable fiber laser with controllable reflector for the two-wavelength method with coupled strip waveguide interferometer reflector.

FIG. 13 shows the detailed overall construction of a modulatable fiber laser according to the two-wavelength method according to FIG. 8. One end of the active fiber 19 is coupled with another fiber 17 which contains a fiber fused coupler 31 constructed as a wavelength multiplexer. The latter serves to couple the pump light of wavelength $\lambda_P$ from a pump light source 2 through the pump light branch 32 into the active fiber 19. During this passage, the active fiber is excited and emits light (signal light) on the wavelengths $\lambda_1$ and $\lambda_2$ given by the doping.

This light propagates in the active fiber 19 and, at the other end of the active fiber, impinges on the controllable reflector 6 by which the reflection factor for two wavelengths $\lambda_1$ and $\lambda_2$ is controlled separately. The controllable reflector 6 in this case is formed of a passive wavelength division multiplexer (WDM) and two integrated-optical intensity modulators in a substrate 36. Light running into the waveguide 35 passes a directional coupler as integrated WDM element 95 (Karthe, Müller, "Integrated Optics", Akadem, Verlagsgesellschaft Geest & Portig KG, Leipzig 1991). The latter is formed of two waveguides which are guided in parallel at a distance of a few micrometers. The guided light is coupled back and forth between the two waveguides periodically. Due to the different propagation constants of the light of wavelengths $\lambda_1$ and $\lambda_2$, after a given length the light of wavelength $\lambda_1$ is guided completely in the waveguide at the top in the Figure and the light of wavelength $\lambda_2$ is guided completely in the waveguide at the bottom in the Figure. At this point, both waveguides are guided apart, so that the light of wavelength $\lambda_1$ is completely guided in the upper waveguide branch and the light of wavelength $\lambda_2$ is guided completely in the lower waveguide branch. Further, every light component passes an electro-optically controllable, integrated-optical intensity modulator 93 and 94 which are acted upon by the control signals 81 and 82. The back-reflection is effected at one of the reflection-coated waveguide end faces $19_1$ and $19_2$. If required for better wavelength selection, the reflection-coated waveguide end faces can be coated in a wavelength-selective manner. The light path or optical path length is completed in the reverse order back to waveguide 35.

Accordingly, the feedback of the fiber laser is controlled and the laser process is completed only for wavelengths $\lambda_1$ and $\lambda_2$ for which a determined reflectivity is adjusted by means of control signals 81 and 82. The laser light of wavelengths $\lambda_1$ and/or $\lambda_2$ further traverses the signal light branch 33 of the fiber fused coupler 31. In this case, the wavelength splitter 13 is a second fiber fused coupler 34. It separates wavelengths $\lambda_1$ and $\lambda_2$. The light of wavelength $\lambda_2$ which is not used is absorbed in the radiation trap 23. If required, a pump light reflector 39 can be arranged in the signal light branch 33. The construction described here is analogous for the two-polarization method.

Figure 14:
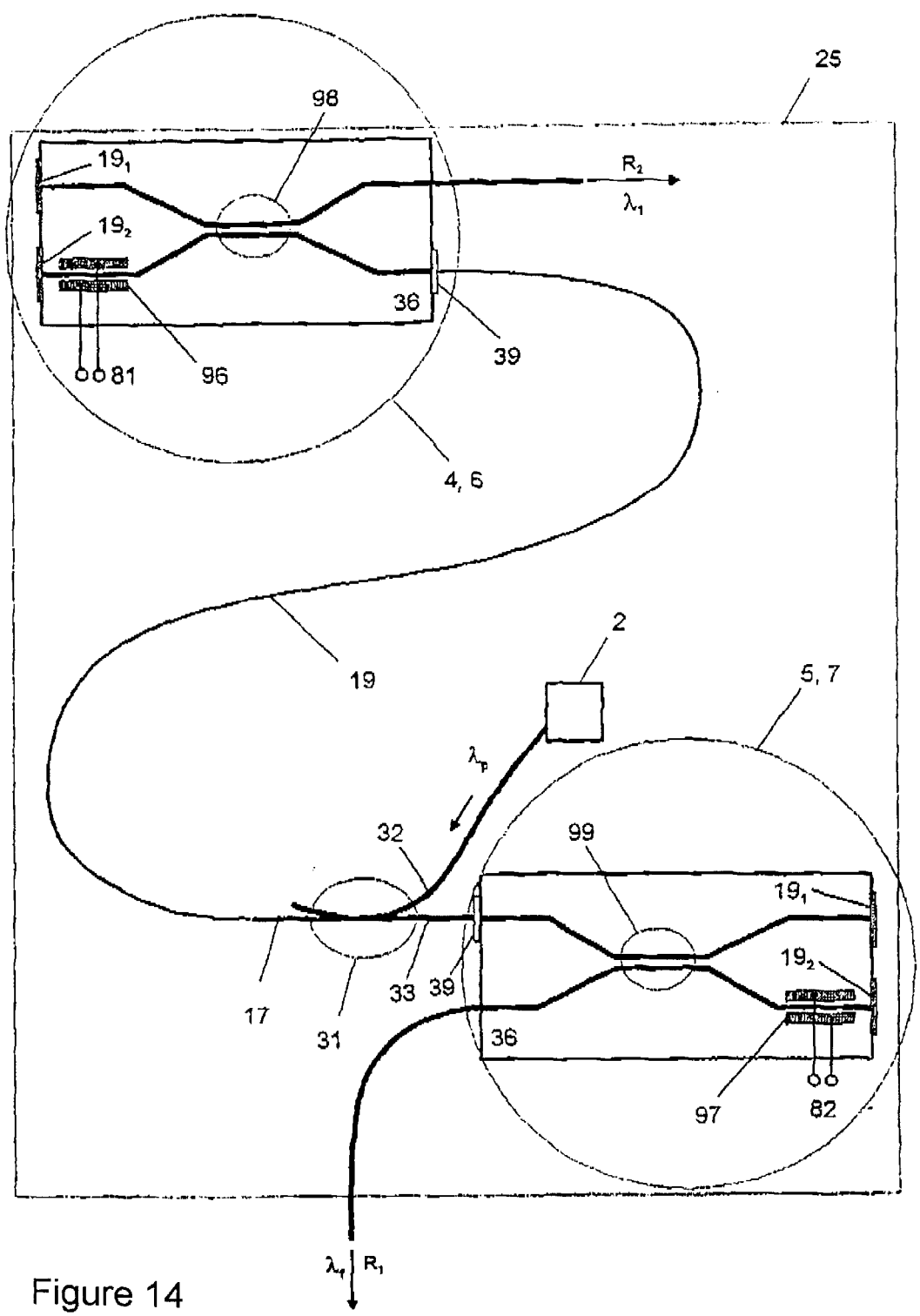
FIG. 14 shows a directly modulatable fiber laser with controllable reflectors according to the two-direction method with two coupled strip waveguide interferometer reflectors.

FIG. 14 shows the detailed overall construction of a modulatable fiber laser according to the two-direction method according to FIG. 9. One end of the active fiber 19 is coupled with another fiber 17 which contains a fiber fused coupler 31 constructed as a wavelength multiplexer. The latter serves to couple the pump light of wavelength $\lambda_P$ from a pump light source 2 through the pump light branch 32 into the active fiber 19. During the passage, the active fiber is excited and emits light (signal light) on the wavelength $\lambda_1$ given by the resonator. This light propagates in the active fiber 19 and the other fiber 17 and the signal light branch 33 and impinges at both ends on controllable reflectors 4 and 5 by which the reflection factor of the arriving light can be controlled. The controllable reflectors 4 and 5 are constructed in a substrate 36 according to the principle of the integrated-optical Michelson interferometer. The reflection factor for wavelength $\lambda_1$ is adjusted continuously by means of a phase modulator 96, 97 in combination with a phase-sensitive component 98, 99. The ratio of forward emission ($R_1$) and reverse emission ($R_2$) can be adjusted by suitable control of the controllable reflectors 4 and 5. If required, a pump light reflector 39 can be arranged in front of the inputs of the controllable reflectors.

FIG. 15 shows the detailed overall construction of a modulatable fiber laser in which a combination of the two-wavelength method and two-direction method is realized. The two ends of the active fiber correspond with two controllable reflectors 4, 6 and 5, 7 in a manner analogous to FIG. 14, wherein a wavelength splitter 95 is arranged in front of each reflector, the latter being combined in an integrated-optical chip 100. These components act as controllable reflectors 5 and 6 and simultaneously, in a wavelength-selective manner, as wavelength splitter 11. In this way, the fiber laser emits light of wavelength $\lambda_1$ from the controllable reflector 5 at the bottom in the Figure and light of wavelength $\lambda_2$ from the controllable reflector 4 at top in the Figure. If the one of the controllable reflectors 4 or 5 is dispensed with, the operating principle changes to the usual two-wavelength method analogous to FIG. 13.

While the foregoing description and drawings represent the present invention, it will be obvious to those skilled in the art that various changes may be made therein without departing from the true spirit and scope of the present.

What is claimed is:

1. A directly modulatable laser comprising:
    an active medium inside a laser cavity formed by a resonator mirror and an out-coupling mirror;
    a pump light source exciting the active medium to generate an inversion density of electrons in the active medium;
    said active medium generating radiation of two wavelengths ($\lambda_1$ and $\lambda_2$);
    said resonator mirror being constructed as at least two controllable reflectors having a reflector cavity composed at least partially of an electro optical medium whose refractive index can be controlled to produce a reflectivity which allows for each of the two wavelengths ($\lambda_1$ and $\lambda_2$) to be individually controllable;
    said controllable reflector being connected with a control unit, which control unit is structured to apply a control signal E to the controllable reflectors;
    said controllable reflectors structured to have controllable reflectivity for the two wavelengths ($\lambda_1$ and $\lambda_2$) in a push-pull structural arrangement so that only one wavelength is reflected at a time at the controllable reflectors in an alternating fashion, so that the inversion density of electrons in the active medium is held constant.

2. The directly modulatable laser according to claim 1, wherein the two emission wavelengths are generated in a broad-band amplifying medium.

3. The directly modulatable laser according to claim 1, wherein the two emission wavelengths are generated in an active medium amplifying on two different lines.

4. The directly modulatable laser according to claim 1, wherein the active medium comprises a solid body or a light-conducting fiber.

5. The directly modulatable laser according to claim 1, wherein a selection of the two wavelengths ($\lambda_1$ and $\lambda_2$) from a spectral band of emission is carried out after the output of the laser.

6. A laser with a laser cavity comprising:
    a resonator mirror and an out-coupling mirror and containing an active medium that is excited by a pump light source to generate an inversion density of electrons in the active medium for radiating with at least two wavelengths ($\lambda_1$ and $\lambda_2$) or two polarizations ($P_1$, $P_2$);
    said resonator mirror or said out-coupling mirror constructed as a controllable reflector having a reflector cavity composed at least partially of an electro optical medium whose refractive index can be controlled to produce a reflectivity which is controllable for two optical parameters consisting of the two wavelengths ($\lambda_1$ and $\lambda_2$) or the two polarizations ($P_1$, $P_2$);
    said out-coupling mirror coupling out radiation of both wavelengths ($\lambda_1$ and $\lambda_2$) or polarizations ($P_1$, $P_2$); and
    the at least one controllable reflector being connected with a control unit which is structured to control the reflectivity of the controllable reflector for the two optical parameters in a push-pull manner, such that the inversion density in the active medium is constant.

7. The laser according to claim 6 with a broad-band amplifying medium for generating two wavelengths ($\lambda_1$ and $\lambda_2$).

8. The laser according to claim 6 with an active medium amplifying on two different spectral lines for generating two wavelengths ($\lambda_1$ and $\lambda_2$).

9. The laser according to claim 6 with a splitter after the output of the laser, by which a selection of the two wavelengths ($\lambda_1$ and $\lambda_2$) or of the two polarizations ($P_1$, $P_2$) is effected.

10. The laser according to claim 9 with a radiation trap for absorbing the radiation of one of the two wavelengths ($\lambda_1$ and $\lambda_2$) or polarizations ($P_1$, $P_2$).

11. The laser according to claim 6, wherein the active medium has solid body or a light-conducting fiber.

12. A method for controlling a directly modulatable laser comprising:

placing an active medium inside a laser cavity formed by a resonator mirror and an out-coupling mirror;

pumping the laser cavity via a pump light source exciting the active medium to generate an inversion density of electrons in the active medium;

generating radiation of two wavelengths ($\lambda_1$ and $\lambda_2$) in said active medium;

placing in said resonator mirror at least two controllable reflectors having a reflector cavity composed at least partially of an electro optical medium;

controlling a refractive index individually of said controllable reflectors to produce a desired reflectivity on each of said controllable reflectors which allows for each of the two wavelengths ($\lambda_1$ and $\lambda_2$) to be individually controllably reflected;

connecting said controllable reflectors with a control unit, sending a control signal E from the control unit to the controllable reflectors, push-pull controlling said controllable reflectors to have controllable reflectivity for the two wavelengths ($\lambda_1$ and $\lambda_2$) in a push-pull manner so that only one wavelength is reflected at a time at the controllable reflectors in an alternating fashion, maintaining the inversion density of electrons in the active medium as constant.

13. A method of controlling a laser comprising:

placing a resonator mirror containing an active medium and a beam splitter in a laser cavity;

pumping an active medium via a pump light source to generate an inversion density of electrons in the active medium;

radiating an emission spectrum from the active medium with at least two wavelengths ($\lambda_1$ and $\lambda_2$);

placing in said resonator mirror controllable reflectors composed at least partially of an electro optical medium;

connecting a control unit to the controllable reflector;

push-pull controlling the controllable reflectors so that only one wavelength is reflected at a time at the controllable reflectors in an alternating fashion, and;

maintaining the inversion density of electrons in the active medium as constant.

* * * * *